E. H. NABHAN.
PICKER STICK.
APPLICATION FILED NOV. 19, 1910.

992,977.

Patented May 23, 1911.

WITNESSES:

INVENTOR.

UNITED STATES PATENT OFFICE.

ELIAS H. NABHAN, OF METHUEN, MASSACHUSETTS.

PICKER-STICK.

992,977.  Specification of Letters Patent. Patented May 23, 1911.

Application filed November 19, 1910. Serial No. 593,238.

*To all whom it may concern:*

Be it known that I, ELIAS H. NABHAN, a citizen of the United States, residing at Methuen, in the county of Essex and State of Massachusetts, have invented certain new and useful Improvements in Picker-Sticks, of which the following is a specification.

My invention relates to picker sticks on looms and is intended to take the place of what is known as the power strap.

As is well known, the power strap of a picker stick is used to support the sweep strap so called at a certain predetermined position upon the picker stick.

The objection to the usual form of power straps which consists of a leather thong attached to the back of the picker stick by a screw or nail is that it quickly wears out, that the screw or nail weakens the picker stick at a weak point and that there is nothing to prevent the sweep strap from rising too high, thereby changing the force of the blow of the picker stick upon the shuttle and also frequently getting caught or jammed with the power strap in an undesirable position.

Another serious objection is that when it is desired to readjust the height of the sweep strap upon the picker stick, it is necessary to bore a new screw hole for the power strap in the picker stick, thus weakening it at a weak point.

Figures 1, 2, 3:
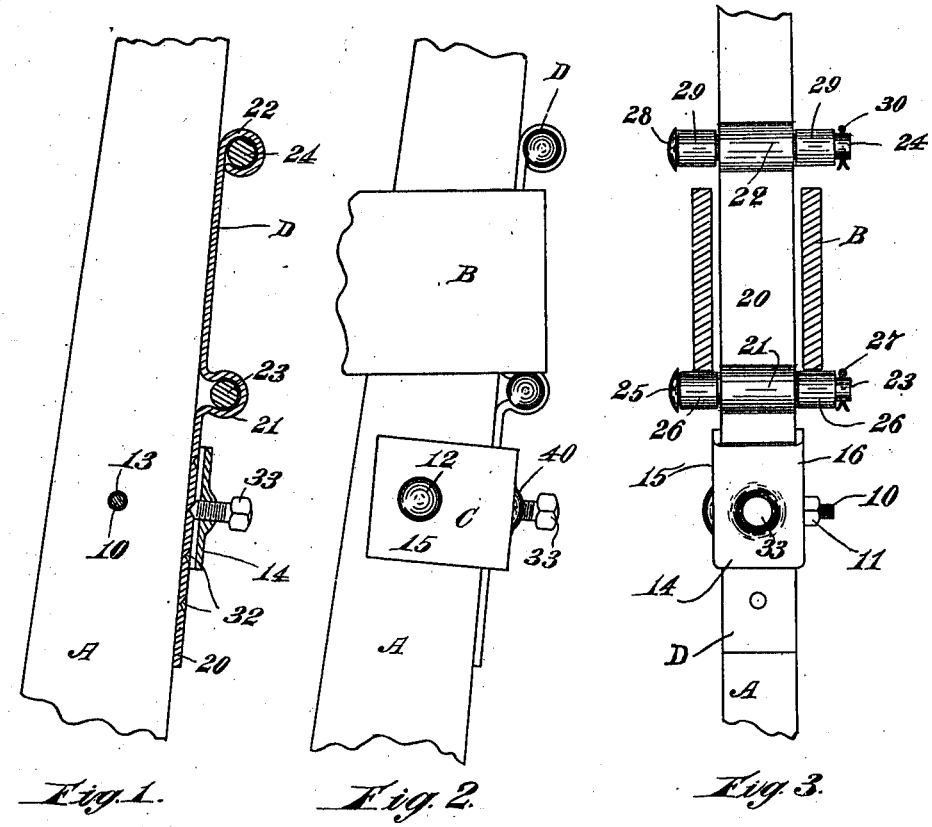
Figure 4:
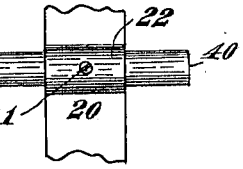

In the drawings, Figure 1 is a side view of a portion of a picker stick with my device attached, said device being shown in vertical section. Fig. 2 is a side elevation of a portion of the picker stick showing the sweep strap and my device in place. Fig. 3 is a rear elevation of a portion of a picker stick showing the sweep strap in section and my device in place. Fig. 4 is a modified form of my upper cross piece.

A represents a picker stick of the usual construction which is ordinarily of wood.

B represents the sweep strap of the usual construction.

My device comprises a clamp C and a supporting member D. Clamp C is a U shaped piece of thin elastic metal through the legs of which pass holes for the reception of a bolt 10 upon the end of which is a binding nut 11. This bolt has a head 12 which is preferably rounded as shown.

Through picker stick A is a hole 13 through which bolt 10 passes. This hole 13 is so bored that when bolt 10 is in place, there will be a clearance between the member 14 which connects the legs 15 and 16 of clamp C and the back of the picker stick.

By using a U shaped clamp C of elastic metal in place of a closed clamp, my clamp can be readily attached to a picker stick of any width.

Through a boss 40 on connecting member 14 which connects legs 15 and 16, I pass a set screw 33 which preferably has a pointed end.

The supporting member D comprises a metallic strip 20 which is preferably bent around at 21 and at 22 as shown to form bearings for the pins 23 and 24 of the cross pieces. These pins 23 and 24 project from each side of bearings 21 and 22 to a distance greater than the width of sweep strap B. Pin 23 has a head 25 and supports rollers 26, 26 which are kept in place by a split pin 27. The sweep strap B normally and naturally by the force of gravity rests upon these rollers 26 which serve to reduce the friction and wear upon the sweep strap as it moves backward and forward with the picker stick, as there is always more or less loose motion in such case.

The upper pin 24 may have a head 28 and carry rolls 29 held in place by a split pin 30 or it may be merely a straight spindle 40 as shown in Fig. 4. Where the rollers are used, it minimizes the friction and wear upon sweep strap B, but as there is very little friction in any case upon the top of the sweep strap, it is not as necessary to use rollers as it is upon the bottom cross piece.

When a spindle 40 without rollers is used, it may be held in place by a set screw 41 as shown in Fig. 4.

To permit vertical adjustment of the support D, I form recesses 32 in strip 20 in such position that set screw 33 which passes through connecting member 14 of clamp C can enter one or the other as desired. Thereby, the supporting member D is vertically adjustable by loosening screw 33 and raising or lowering it and then tightening screw 33.

What I claim as my invention and desire to cover by Letters Patent is:—

In a supporter for sweep straps, the combination of a supporting member which comprises a vertical metallic strip having recesses and so bent as to support two pins at right angles to said strip, and rollers carried by the lower pin, with a U shaped clamp bolted to the picker stick and having a set screw which enters one of said recesses in said metallic strip.

In testimony whereof I hereto affix my signature in presence of two witnesses.

ELIAS H. NABHAN.

Witnesses:
JOHN M. KEENAN,
GARDNER W. PEARSON.

---

Copies of this patent may be obtained for five cents each, by addressing the "Commissioner of Patents, Washington, D. C."